United States Patent
Coffman (10) Patent No.: US 9,464,811 B2
(45) Date of Patent: Oct. 11, 2016

(54) WOOD FUELED CAMPING STOVE (71) Applicant: Jeffrey Lee Coffman, Belington, WV (US)

(72) Inventor: Jeffrey Lee Coffman, Belington, WV (US)

( * ) Notice: Subject to any disclaimer, the term of this patent is extended or adjusted under 35 U.S.C. 154(b) by 316 days.

(21) Appl. No.: 14/307,376

(22) Filed: Jun. 17, 2014

(65) Prior Publication Data

US 2014/0366863 A1 Dec. 18, 2014

Related U.S. Application Data (60) Provisional application No. 61/956,754, filed on Jun. 17, 2013.

(51) Int. Cl.
*A47J 33/00* (2006.01)
*F24B 1/02* (2006.01)
*A47J 37/07* (2006.01)
*F24B 1/20* (2006.01)

(52) U.S. Cl.
CPC ............. *F24B 1/022* (2013.01); *A47J 33/00* (2013.01); *A47J 37/0718* (2013.01); *F24B 1/202* (2013.01)

(58) Field of Classification Search
CPC ..... A47J 37/0718; A47J 33/00; F24B 1/202; F24B 1/022
See application file for complete search history.

(56) References Cited

U.S. PATENT DOCUMENTS

| | | | |
|---|---|---|---|
| 1,423,612 A * | 7/1922 | Jewett | A47J 33/00 126/30 |
| 1,622,176 A * | 3/1927 | Bishop | F24B 1/202 126/29 |
| 4,198,561 A | 4/1980 | Fujioka | |
| 4,909,235 A | 3/1990 | Boetcker | |
| 5,495,845 A | 3/1996 | Hait | |
| 6,520,173 B2 | 2/2003 | Lautner | |
| 6,827,077 B1 * | 12/2004 | Haas | A47J 33/00 126/25 A |
| 7,861,705 B2 | 1/2011 | Hulsey | |
| 8,701,650 B2 | 4/2014 | Huggins | |
| 2006/0102163 A1 * | 5/2006 | Sanders | A47J 33/00 126/30 |
| 2013/0112187 A1 | 5/2013 | Cedar et al. | |

* cited by examiner

*Primary Examiner* — Alfred Basichas
(74) *Attorney, Agent, or Firm* — Dinsmore & Shohl LLP; Monika L. Jaensson, Esq.

(57) ABSTRACT

A wood fueled camping stove generally including (a) a stove chamber having an aperture, a tubular heat riser and a burn chamber, wherein the burn chamber extends perpendicularly from the heat riser; (b) a fuel feed drawer received in the aperture of the stove chamber, the fuel feed drawer having a forward portion and a drawer portion, wherein the drawer portion is sized and shaped to be received in and supported by the burn chamber; (c) telescopic legs extending from said stove chamber, adjustable by means of snap buttons and corresponding apertures; (d) a standoff grate, positioned on an interior ledge of said stove chamber; (e) a skillet having a short, hollow tube affixed to the side thereof, with corresponding apertures to receive the handle in a plurality of positions; (f) a pot having a short, hollow tube affixed to the side thereof, with corresponding apertures to receive the handle in a plurality of positions; (g) a tube affixed to the exterior of the stove chamber; and (h) a handle received in and removable from said tube; wherein the stove chamber, the skillet and the pot are sized and configured to form a unified unit for storage.

9 Claims, 10 Drawing Sheets

WOOD FUELED CAMPING STOVE

BACKGROUND OF THE INVENTION

The present invention regards a compact, efficient, wood fueled camping stove that allows a user to utilize a readily available source, wood, to cook with rather than having to pack conventional sources such as propane or alcohol.

Wood fueled camping stoves of the prior art require the user to constantly push wood fuel toward the back of the burn shelf, or to repeatedly remove the pot or skillet to add fuel to the burn chamber from the top. The present invention remedies these problems by allowing the user to add fuel vertically in a fuel feed drawer.

The present invention further incorporates a standoff grate, a skillet and a pot, secured together with the stove chamber, to form a single unit, relieving the user of having to pack these items individually.

BRIEF SUMMARY OF THE INVENTION

The wood fueled camping stove of the present invention generally includes (a) a stove chamber having an aperture, a tubular heat riser and a burn chamber, wherein the burn chamber extends perpendicularly from the heat riser; (b) a fuel feed drawer received in the aperture of the stove chamber, the fuel feed drawer having a forward portion and a drawer portion, wherein the drawer portion is sized and shaped to be received in and supported by the burn chamber; (c) telescopic legs extending from said stove chamber, adjustable by means of snap buttons and corresponding apertures; (d) a standoff grate, positioned on an interior ledge of said stove chamber; (e) a skillet having a short, hollow tube affixed to the side thereof, with corresponding apertures to receive the handle in a plurality of positions; (f) a pot having a short, hollow tube affixed to the side thereof, with corresponding apertures to receive the handle in a plurality of positions; (g) a tube affixed to the exterior of the stove chamber; and (h) a handle received in and removable from said tube; wherein the stove chamber, the skillet and the pot are sized and configured to form a unified unit for storage.

Embodiments of the present invention include stove chambers with a defined curvature, and fuel feed drawers having a front curved face with substantially the same curvature as the stove chamber. In some embodiments, the front curved face is dimensionally larger than the dimensions of the aperture of the stove chamber. In other embodiments, the front curved face has semicircular apertures to allow a user to position the fuel feed drawer within the stove chamber.

Further, in some embodiments the tubular heat riser has a plurality of apertures positioned around the top portion of said heat riser. In some embodiments of the present invention, the skillet includes a surface and a rim, wherein the rim extends perpendicularly from the surface, and wherein the cylindrical surface has a circumference smaller than the interior circumference of the chamber.

DETAILED DESCRIPTION

Figure 1:
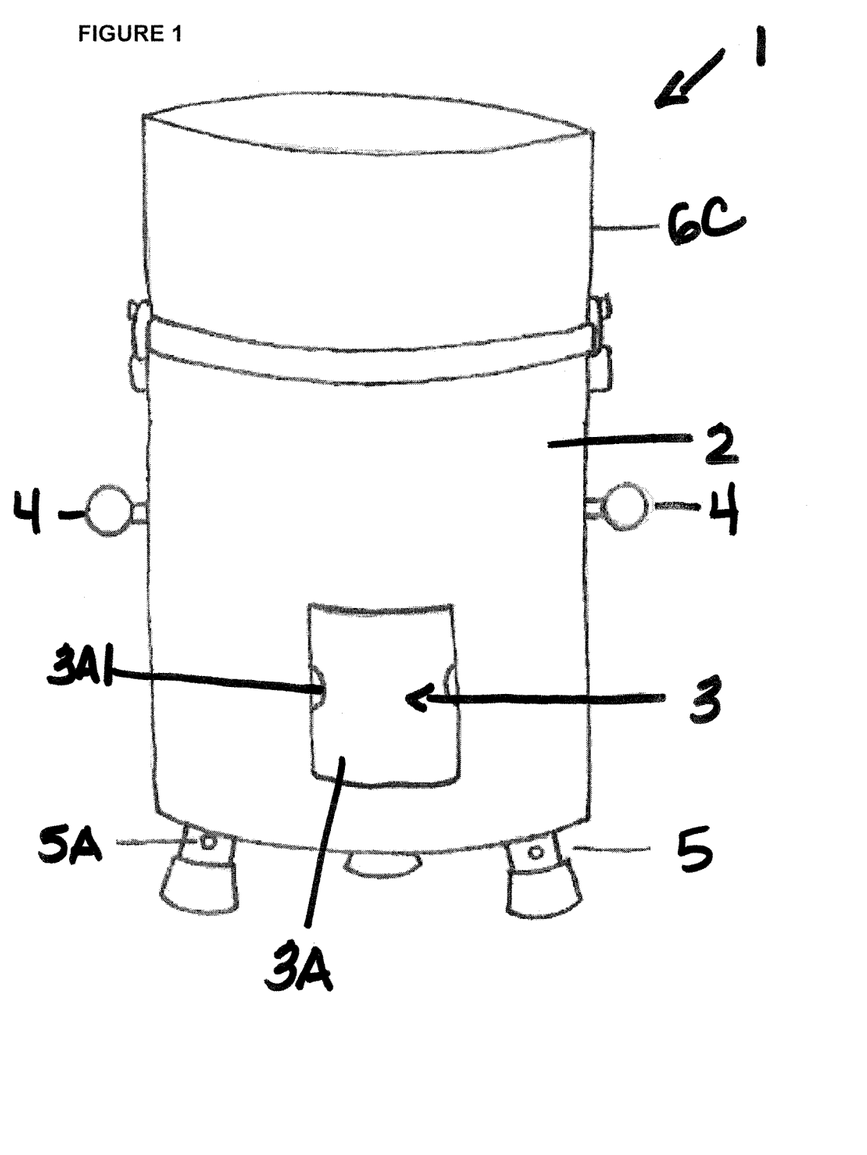
FIG. 1 is a front view of an embodiment of the present invention, in a packed arrangement.
Figure 2:
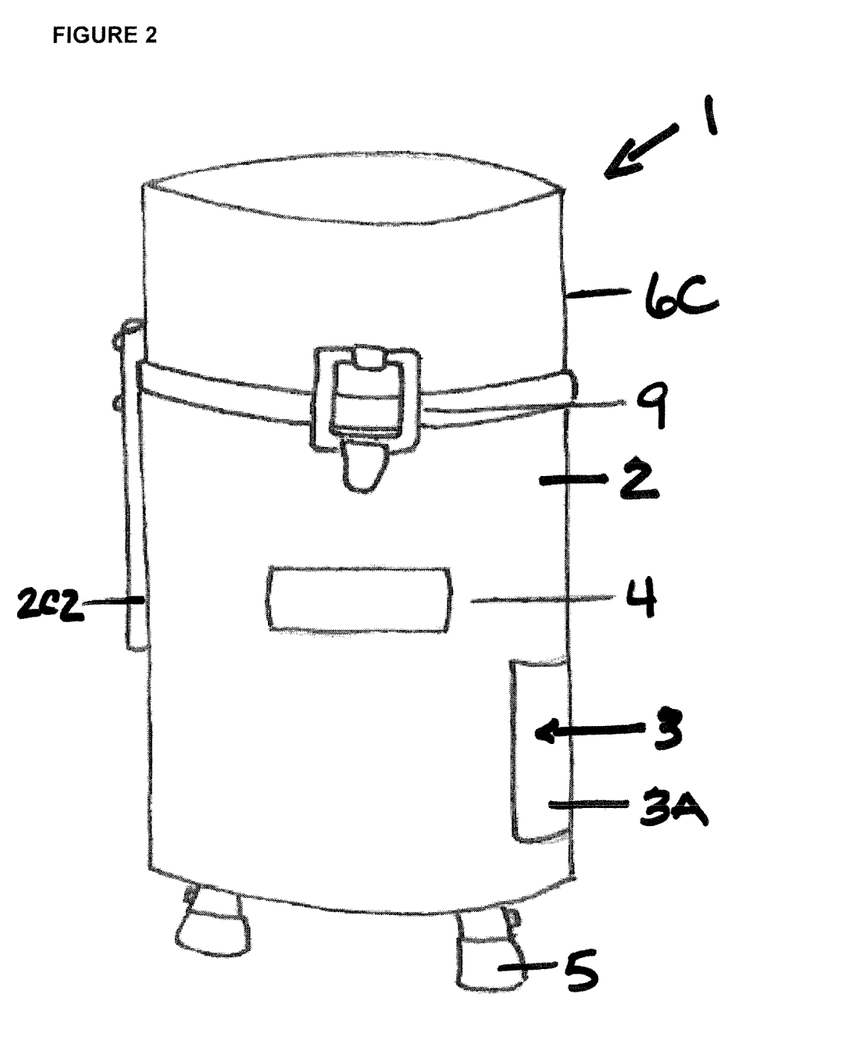
FIG. 2 is a side view of an embodiment of the present invention, in a packed arrangement.
Figure 3:
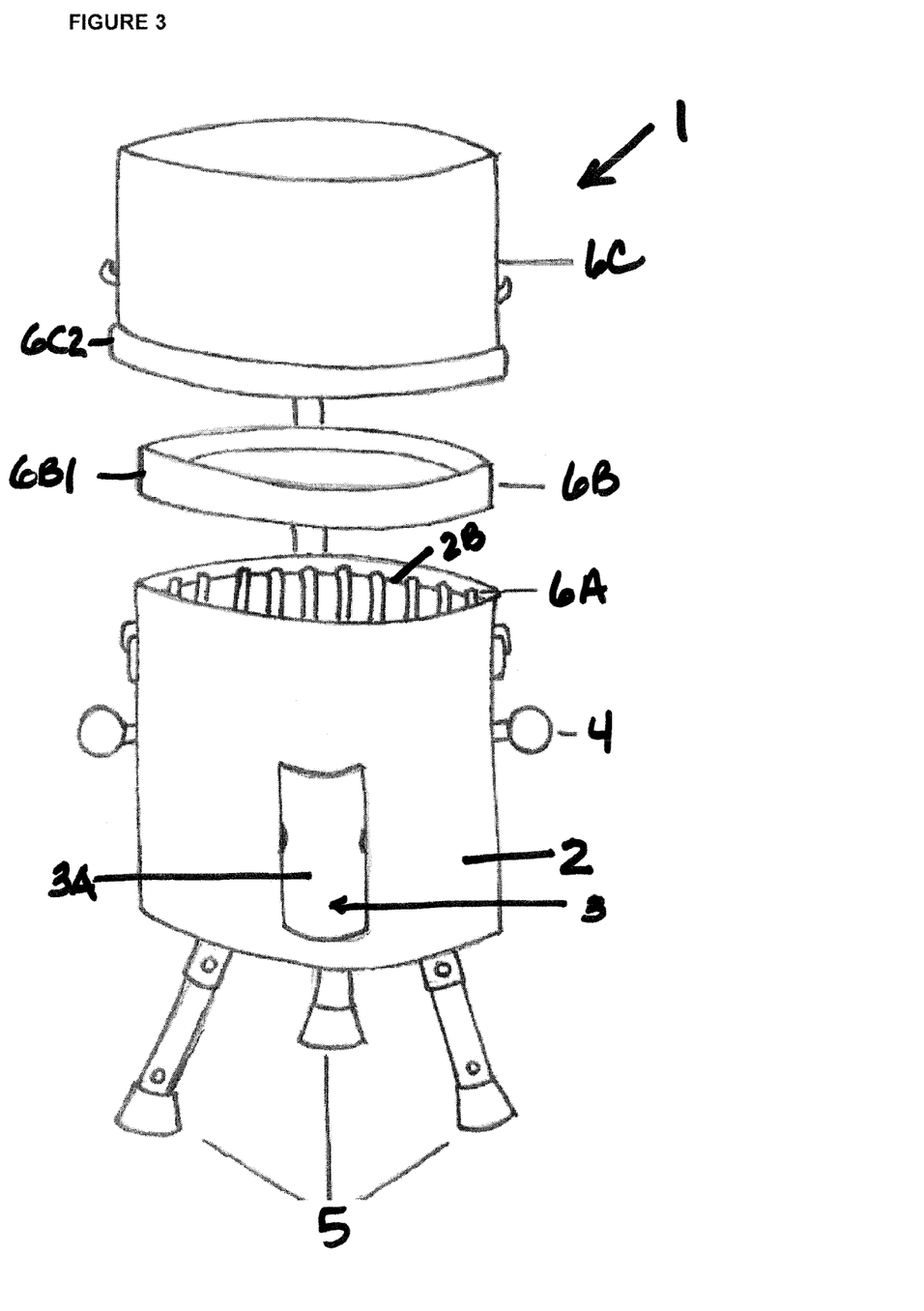
FIG. 3 is an exploded view of an embodiment of the present invention, from the front.
Figure 4:
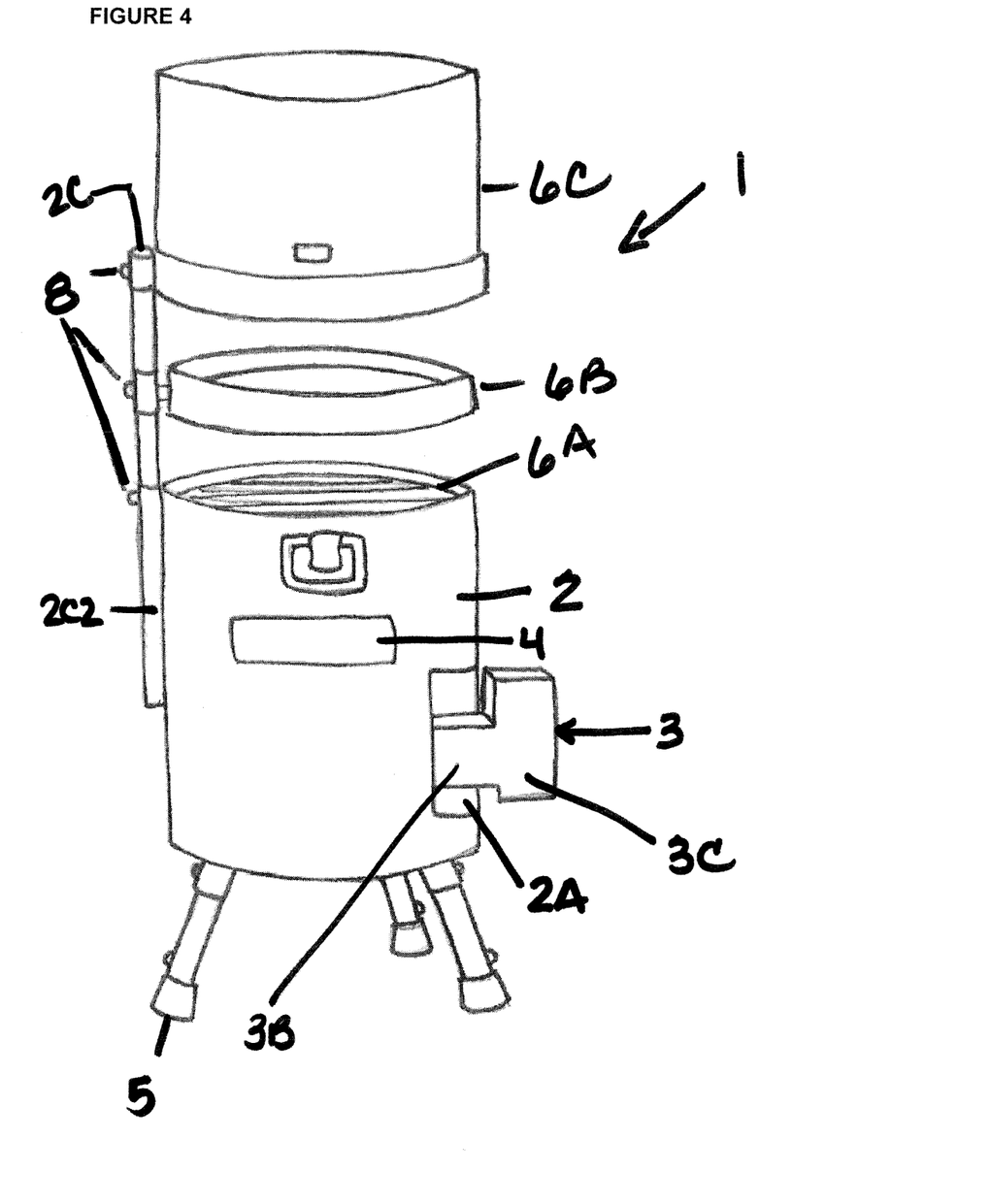
FIG. 4 is an exploded view of an embodiment of the present invention, from the side.
Figure 8:
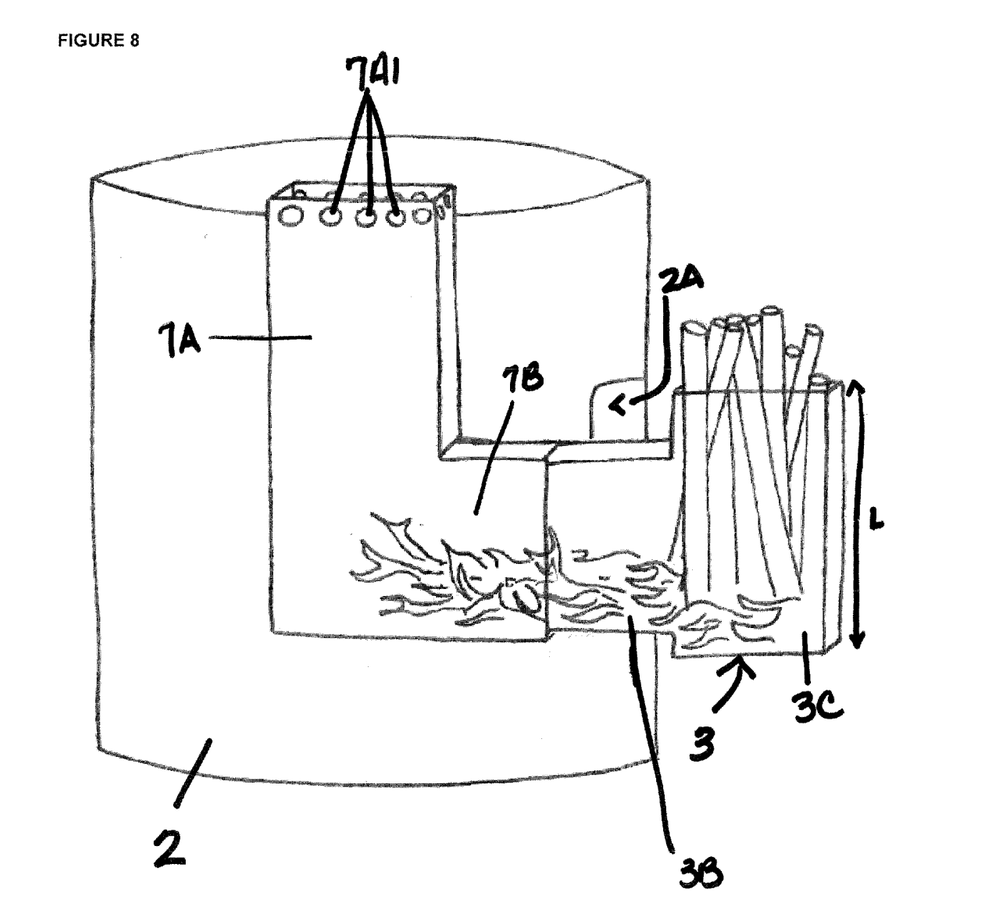
FIG. 8 is an interior view of an embodiment of the stove chamber of the present invention.

Referring to FIGS. 1 and 2, a wood fueled camping stove 1 of an embodiment of the present invention comprises a substantially cylindrical stove chamber 2 and a fuel feed drawer 3. As shown in FIGS. 3, 4 and 8, the stove chamber 2 has a consistent curvature on the exterior surface thereof, and an aperture 2A to receive the fuel feed drawer 3. The fuel feed drawer 3 has a front curved face 3A that has substantially the same curvature as the stove chamber 2 so that when in the retracted position (shown in FIGS. 1 and 2), the front curved face 3A is flush with the exterior of the cylindrical stove chamber 2; however, in some embodiments the front curved face 3A of the fuel feed drawer 3 is dimensionally larger than the aperture 2A of the cylindrical stove chamber, to allow the face to rest on a portion of the exterior surface of the stove chamber 2. The front face 3A may also have semicircular apertures 3A1, as shown in FIG. 1, to allow a user to position the fuel feed drawer 3 within and remove the same from the stove chamber 2.

As shown in FIG. 8, the stove chamber 2 comprises a tubular heat riser 7A and burn chamber 7B. The heat riser 7A is positioned in the stove chamber 2, with its central axis near or at the center axis of the stove chamber, and provides the cooking heat to the top of the stove chamber. Apertures 7A1 are positioned around the top portion of the heat riser 7A to facilitate the radial dispersion of heat at the upper portion of the stove chamber 2. The burn chamber 7B extends perpendicularly from the bottom of the heat riser 7A, and allows fire from the fuel feed drawer 3 to be drawn into the heat riser 7A. The heat riser and burn chamber are depicted in the Figures with rectangular cross-sections; however, they may be circular cross sections would be suitable as well.

As shown in FIGS. 4 and 8, the fuel feed drawer 3 further has a forward portion 3C and a drawer portion 3B. The drawer portion 3B has side walls, a bottom surface and a top surface, to form a tube and facilitate movement of fire and heat burning in the forward portion, up through the heat riser to the upper portion of the stove chamber 2. The forward portion 3C of the fuel feed drawer has the front face 3A as described above, side walls, and a bottom surface to form a box, open at the face of the drawer portion 3B; as shown in the Figure, this portion of the fuel feed drawer 3 is designed and configured to support burning wood upright to facilitate heat generation, so that fire and heat from said burning wood can be provided through the heat riser to the upper portion of the stove chamber 2. The side walls of the forward portion 3C extend the entire length L of the front curved face 3A to support the face; back walls are provided on the forward portion 3C above and below the drawer portion top and bottom surfaces. Thereby, the drawer portion 3B extends from the forward portion 3C, allowing the base of the forward portion to collect and retain ashes and other debris from burning wood, without interfering with the heat and fire transfer through the drawer portion and the burn chamber, to the heat riser 7A.

As shown in FIG. 8, the burn chamber 7B is sized and shaped to removably receive and support the drawer portion 3B of the fuel feed drawer. Thereby, the fuel feed drawer is supported by the structure of the burn chamber 7B, and may be drawn within said structure when the stove is not in use, or may extend from while still being supported by said structure when the stove is in use.

In some embodiments the stove chamber 2 includes handles 4 on the sides thereof to allow users to carry the stove of the present invention. Further, the stove chamber 2 may be supported from the ground by telescoping legs 5 comprising two or more tubes. The legs may be extended and retracted by snap buttons 5A affixed to the interior tube(s) of the telescoping legs, and apertures on the exterior tube(s) of the telescoping legs. In the embodiment shown, three telescoping legs 5 support the stove chamber 2.

The wood fueled camping stove of the present invention further includes a standoff grate 6A, a skillet 6B and a pot 6C. The grate 6A rests on an interior ledge 2B of the stove chamber 2. The skillet 6B is a cylindrical surface having a rim 6B1. In some embodiments the rim 6B1 of the skillet extend perpendicularly from the surface; in some embodiments the rim extends at an angle. The cylindrical surface may be the same circumference as the circumference of the chamber 2; in some embodiments, however, the circumference of the cylindrical surface of the skillet 6B is smaller than the internal circumference of the chamber 2, with rim 6B1 the same or greater height as the distance between the standoff grate when positioned above the ledge and the top of the chamber 2, so that the skillet may be stored on the grate when the stove is assembled for storage.

Figure 7:
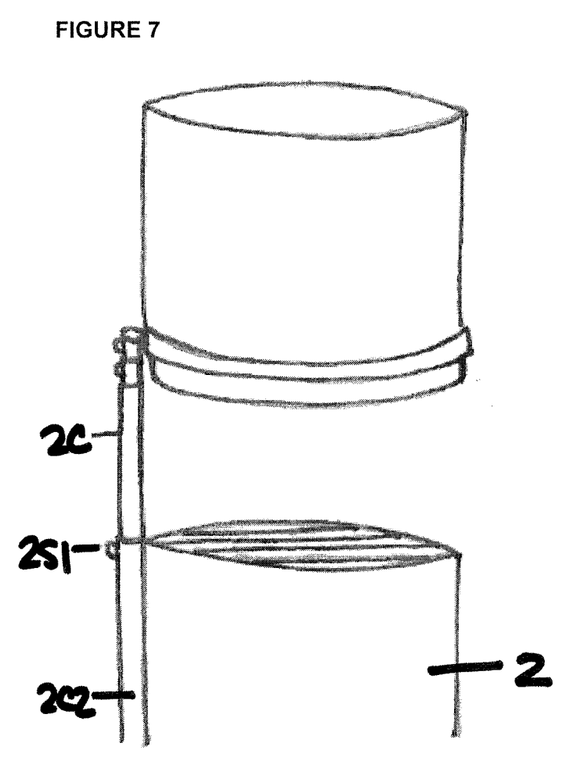
FIG. 7 is an exploded view of an embodiment of the present invention, from the front.
Figure 10:
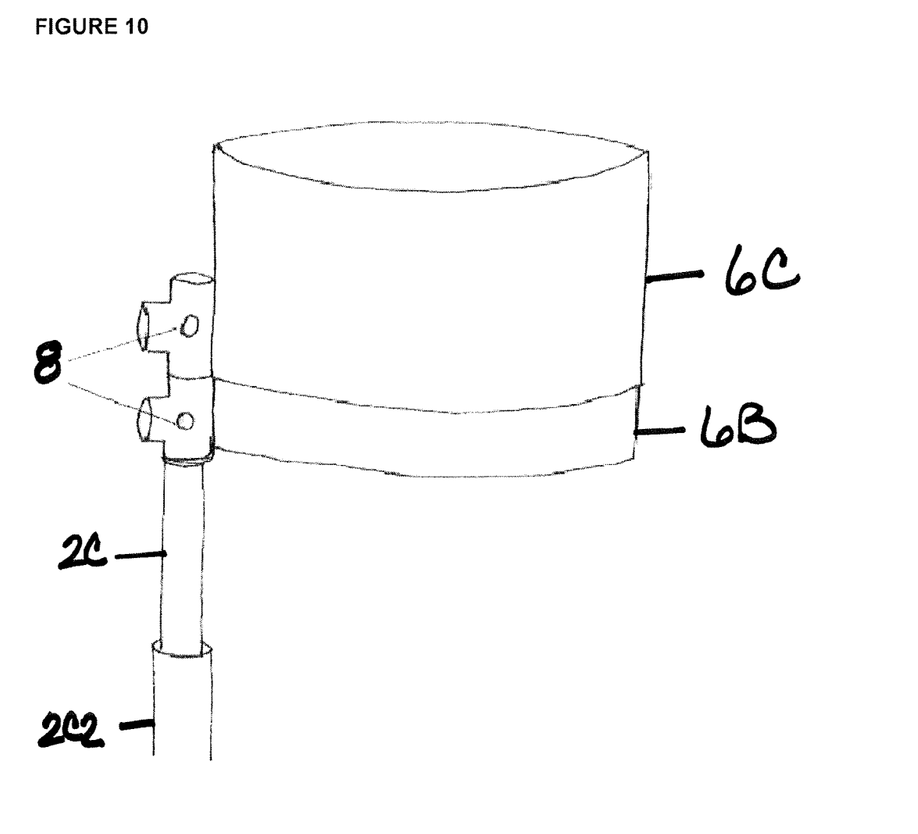
FIG. 10 is a perspective view of an embodiment of the oven arrangement of the present invention.

The pot 6C has a circumference the same as or smaller than the circumference of the chamber 2, to form a unified cylindrical unit when the stove is assembled for storage. In some embodiments a hoop 6C2 is provided near the top of the pot 6C. As shown in FIGS. 7 and 10, the pot 6C may be inverted over the skillet 6B to make an oven. The height of the oven can be adjusted using the handle 2C positioned in the tube 2C2, and the skillet 6B being positioned at a specific height by means of the snap buttons 2S1 and corresponding apertures, as shown in FIG. 7, allowing the user to regulate the temperature of the oven. Further, the pot is intended to be inverted over the skillet when the stove 1 is assembled for storage.

Figure 5:
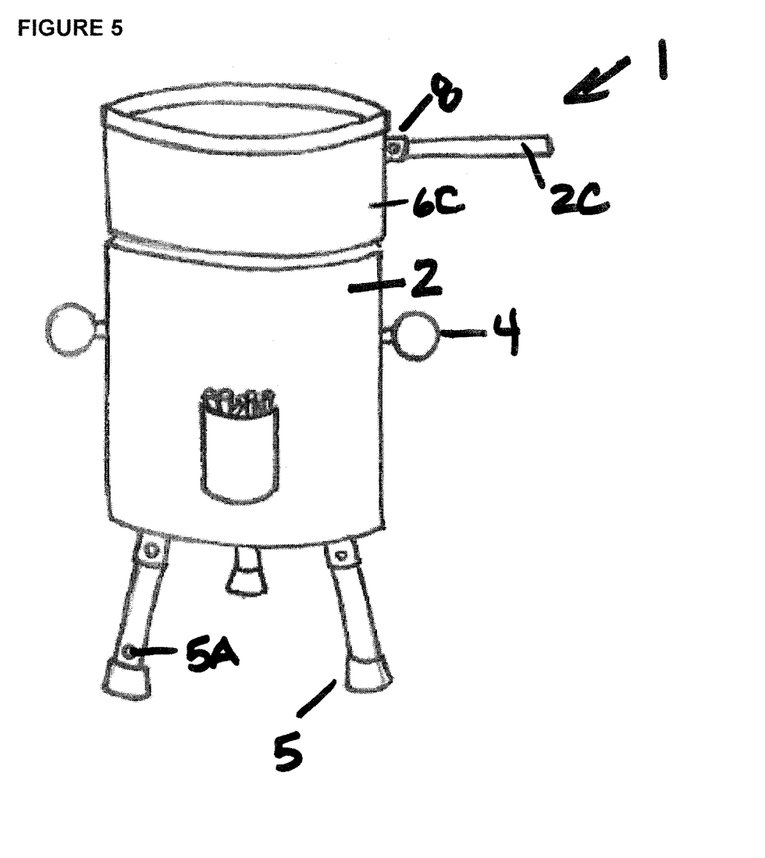
FIG. 5 is a front view of an embodiment of the present invention, with the pot in use.
Figure 6:
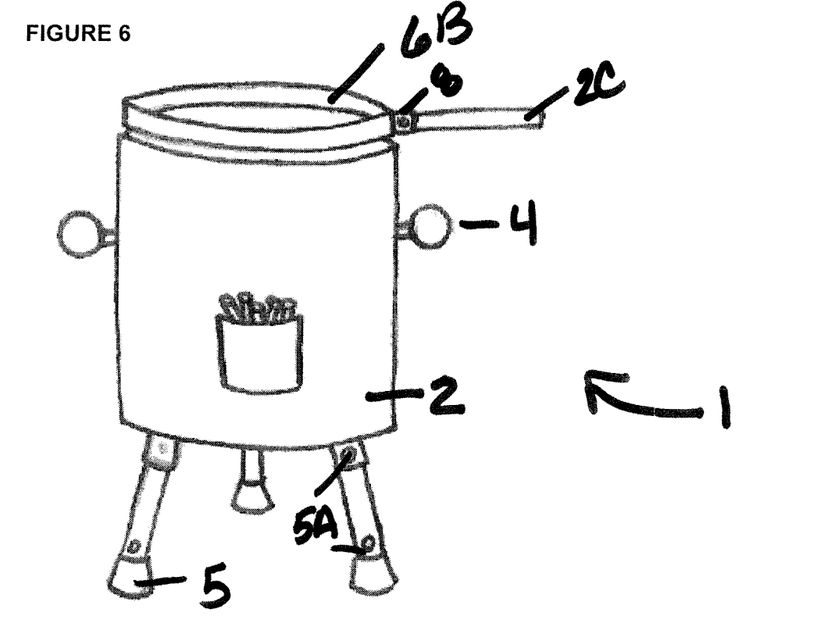
FIG. 6 is a front view of an embodiment of the present invention, with a skillet in use.
Figure 9:
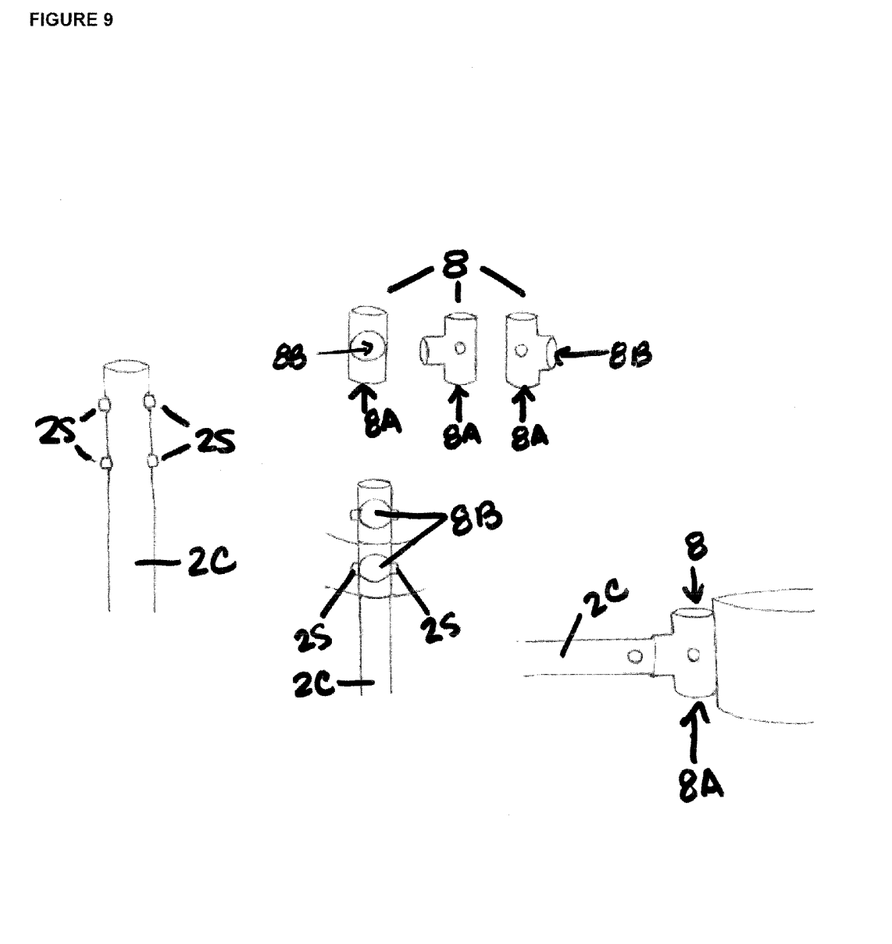
FIG. 9 is a perspective view of an embodiment of the handle and chamber tube, and the short, hollow tube of each of the griddle and pot, of the present invention.

As shown in FIGS. 1, 2 and 9, each of the skillet 6B and the pot 6C (or the hoop 6C2 of the pot) have a short, hollow tube 8 affixed to the side thereof, with corresponding apertures 8A and 8B through the tubular structure. The interior of the tube and said apertures are sized and configured to receive a handle 2C, either to secure the skillet and pot when assembled for storage or baking (as shown in FIG. 7), or to extend outward from said elements to facilitate cooking (as shown in FIGS. 5 and 6). Another tube 2C2 is secured to said stove chamber 2 along the side thereof, by welding or otherwise, sized to receive the handle 2C when the stove is assembled for storage. Additional tubes may be telescopically included in accordance with the handle/tube structure herein described. The handle 2C has a plurality of snap buttons 2S, and the tube(s) 2C2 have apertures to receive such snap buttons, to allow the handle to be positioned perpendicular to such elements and allow the unit to function as an oven (as shown in FIG. 7), or for storage. Thereby, the handle may be positioned within the apertures 8B of the tubes 8 affixed to the pot or skillet, snapped to secure the same as they rest upon the top of the grate. Similarly, the handle 2C is received by the chamber tube 2C2, and a snap button 2S1 on the handle can secure the same to a corresponding aperture on the chamber 2.

The pot, griddle and stove of the present invention may be assembled for storage as hereinabove described and locked together by means of at least one locking mechanism 9 affixed to the side of the pot 6C, as shown in FIG. 2, with corresponding structure on the stove chamber 2 to receive the end of the locking mechanism 9.

The present invention, in its retracted state, provides the user with easy portability. When the need for cooking or heating arises, the unit can be easily transformed into an efficient cook stove. The telescopic snap button legs can be extended for stability and safety from any combustible material beneath the cook stove. The pot can be unlocked to reveal the skillet and standoff grate incorporated inside the unit. The fuel feed drawer can be extended to accept the fuel. The user can then ignite any combustible material into the fuel feed drawer, creating a draft through the burn chamber and up through the heat riser. Wood is then added vertically to the fuel feed. The air being pulled into the fuel feed, through the burn chamber and up the heat riser, causes only the bottom tips of the wood to burn. Burning the fuel vertically results in gravity causing the wood to self feed the fire.

It is noted that the terms "substantially" and "about" may be utilized herein to represent the inherent degree of uncertainty that may be attributed to any quantitative comparison, value, measurement, or other representation. The terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A wood fueled camping stove comprising: a. a stove chamber comprising an aperture, a tubular heat riser and burn chamber, wherein the burn chamber extends perpendicularly from the heat riser; b. a fuel feed drawer received in said aperture of said stove chamber, said fuel feed drawer having a forward portion and a drawer portion, wherein the drawer portion is sized and shaped to be received in and supported by said burn chamber; c. telescopic legs extending from said stove chamber, adjustable by means of snap buttons and corresponding apertures; d. a standoff grate, positioned on an interior ledge of said stove chamber; e. a tube affixed to the exterior of the stove chamber; and f. a handle received in and removable from said tube; g. a skillet having a short, hollow tube affixed to the side thereof, with corresponding apertures to receive the handle in a plurality of positions; h. a pot having a short, hollow tube affixed to the side thereof, with corresponding apertures to receive the handle in a plurality of positions; and wherein the stove chamber, the skillet and the pot are sized and configured to form a unified unit for storage.

2. The wood fueled camping stove of claim 1, wherein the stove chamber has a defined curvature, and the fuel feed drawer comprises a front curved face that has substantially the same curvature as the stove chamber.

3. The wood fueled camping stove of claim 2, wherein said front curved face is dimensionally larger than the dimensions of the aperture of the stove chamber.

4. The wood fueled camping stove of claim 2, wherein said front curved face has semicircular apertures to allow a user to position the fuel feed drawer within the stove chamber.

5. The wood fueled camping stove of claim 1, wherein said tubular heat riser comprises a plurality of apertures positioned around the top portion of said heat riser.

6. The wood fueled camping stove of claim 1, wherein said stove chamber further comprises handles.

7. The wood fueled camping stove of claim 1, wherein said skillet comprises a surface and a rim, extending perpendicularly from the surface, wherein the cylindrical surface has a circumference smaller than the interior circumference of the chamber.

8. The wood fueled camping stove of claim 1, further comprising a locking mechanism to allow said components to be locked together as a single unit.

9. The wood fueled camping stove of claim 1, wherein said skillet and said pot are designed and configured to form an oven, a distance above the grate, being removably affixed to said handle received in said tube.

* * * * *